(12) United States Patent
Chen

(10) Patent No.: US 9,273,974 B1
(45) Date of Patent: Mar. 1, 2016

(54) TRIP PLANNING METHOD BY USING AN AUTOMOTIVE PRODUCT

(71) Applicant: E-LEAD ELECTRONIC CO., LTD., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 14/515,228

(22) Filed: Oct. 15, 2014

(51) Int. Cl.
*G01C 21/36* (2006.01)
*G01C 21/34* (2006.01)

(52) U.S. Cl.
CPC .............. *G01C 21/34* (2013.01); *G01C 21/362* (2013.01); *G01C 21/3605* (2013.01)

(58) Field of Classification Search
CPC ........ G01C 21/00; G01C 21/32; G01C 21/34; G01C 21/36; G01C 21/362; G06F 17/30241
USPC ........... 701/36, 400, 409, 410, 420, 462, 522, 701/524, 532, 533
See application file for complete search history.

(56) References Cited

U.S. PATENT DOCUMENTS

| | | | | |
|---|---|---|---|---|
| 6,246,688 | B1 * | 6/2001 | Angwin | H04L 12/2856 370/392 |
| 6,487,494 | B2 * | 11/2002 | Odinak | G08G 1/096872 340/988 |
| 7,151,997 | B2 * | 12/2006 | Uhlmann et al. | 701/409 |
| 7,646,296 | B2 * | 1/2010 | Ohki | 340/539.13 |
| 8,532,574 | B2 * | 9/2013 | Kirsch | 455/41.2 |
| 8,577,543 | B2 * | 11/2013 | Basir et al. | 701/31.4 |
| 8,706,318 | B2 * | 4/2014 | Jauch et al. | 701/1 |
| 8,825,362 | B2 * | 9/2014 | Kirsch | 701/430 |
| 2002/0143463 | A1 * | 10/2002 | Odinak | G08G 1/096872 701/431 |
| 2005/0065779 | A1 * | 3/2005 | Odinak | G10L 15/30 704/201 |
| 2007/0016362 | A1 * | 1/2007 | Nelson | 701/200 |
| 2007/0136459 | A1 * | 6/2007 | Roche | H04L 29/06027 709/224 |
| 2008/0027643 | A1 * | 1/2008 | Basir et al. | 701/213 |
| 2008/0147410 | A1 * | 6/2008 | Odinak | G10L 15/26 704/270.1 |
| 2010/0114469 | A1 * | 5/2010 | Chao | G01C 21/3484 701/532 |
| 2011/0219105 | A1 * | 9/2011 | Kryze | G06F 15/16 709/223 |
| 2012/0150427 | A1 * | 6/2012 | Jeong | G01C 21/3697 701/409 |
| 2012/0197523 | A1 * | 8/2012 | Kirsch | 701/426 |
| 2012/0254960 | A1 * | 10/2012 | Lortz | H04L 63/104 726/7 |
| 2012/0303177 | A1 * | 11/2012 | Jauch et al. | 701/1 |
| 2014/0280552 | A1 * | 9/2014 | Ng et al. | 709/204 |
| 2014/0280580 | A1 * | 9/2014 | Langlois et al. | 709/204 |
| 2014/0336875 | A1 * | 11/2014 | Sigal et al. | 701/36 |
| 2014/0366125 | A1 * | 12/2014 | Murata et al. | 726/17 |
| 2015/0247736 | A1 * | 9/2015 | Moore | G01C 21/36 701/519 |

* cited by examiner

*Primary Examiner* — Thomas Tarcza
*Assistant Examiner* — Tyler J Lee
(74) *Attorney, Agent, or Firm* — Wang Law Firm, Inc.

(57) ABSTRACT

A trip planning method by using an automotive product includes: connecting, by an application program, a mobile device to a network server; editing a destination file on the mobile device, skipping to a step 2 after sending out a transfer instruction by a user; the step 2 of detecting, by the application program, whether the mobile device is connected to an automotive product; if yes, sending the destination file to the automotive product, and skipping to a step 4; if not, sending and saving the destination file in the mobile device account, then skipping to a step 3 which includes connecting the mobile device and the automotive product, by the user, to the automotive product and the network server, respectively, and acquiring the destination file from the network server, then skipping to the step 4 which includes carrying out navigation by the automotive product based on the destination file.

10 Claims, 3 Drawing Sheets

US 9,273,974 B1

TRIP PLANNING METHOD BY USING AN AUTOMOTIVE PRODUCT

BACKGROUND OF THE INVENTION

1. Field of the Invention

The present invention relates to method for car navigation, and more particularly to a trip planning method by using an automotive product.

2. Description of the Prior Art

With the development of science and technology, various automotive products are becoming more and more advanced. For example, automotive audio has been developed from a simple radio to a cassette, CD and DVD player. Even navigation system and Bluetooth are also becoming more common.

Since the navigation device is installed in the car, the user, whining using a conventional navigation device, has to get into the car to set destinations on the navigation device, then the navigation can be carried out.

However, the conventional navigation device still needs to be improved in many respects. For example, since all conventional navigation devices are installed in the car, the user has to stay in the car, otherwise, destination planning and navigation cannot be carried out. Therefore, in the past, users get used to set destinations only after getting into the car, which is time wasting and troublesome.

The present invention has arisen to mitigate and/or obviate the afore-described disadvantages.

SUMMARY OF THE INVENTION

The primary objective of the present invention is to provide a trip planning method by using an automotive product which enables the user to set navigation destination, even when the user is not in the car. Besides, the user can pre-edit a destination file before getting into the car, then navigation can be carried out immediately once the user gets into the car, To achieve the above objective, a trip planning method by using an automotive product in accordance with the present invention comprises the following steps: a first step of forming a database on a network server, the database having at least one mobile device account and a map site, the at least one mobile device account at least including a basic data of a mobile device connected to the network server via an application program; editing, by an user, a destination file on the mobile device, skipping to a step 2 after sending out a transfer instruction by the user; the step 2 of detecting, by the application program, whether the mobile device is connected to an automotive product; sending, by the application program, the destination file to the automotive product, and skipping to a step 4, if the mobile device is found to be connected to the automotive product; sending and saving the destination file, by the application program, to the network server and saving the destination file in the mobile device account, then skipping to a step 3; the step 3 of connecting the mobile device, by the user, to the automotive product; acquiring, by the automotive product, the basic data of the mobile device; connecting the automotive product to the network server, and sending out the basic data of the mobile device; detecting, by the network server, whether the basic data of the mobile device is saved in the mobile device account or not, if yes, skipping to the step 4; and the step 4 of carrying out navigation by the automotive product based on the destination file.

The trip planning method by using an automotive product of the present invention provides the following advantages: before getting into a car, the user can pre-edit a destination file with a mobile device, and then sends the destination file to an automotive product of the car after getting into the car. Or, the user, before getting into a car, can pre-edit a destination file with a mobile device, then sends the destination file to a network server, and then the network server sends the destination file to an automotive product of the car, so that navigation can be carried out right after the user gets into the car, without requiring the use of mobile device or automotive product anymore.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
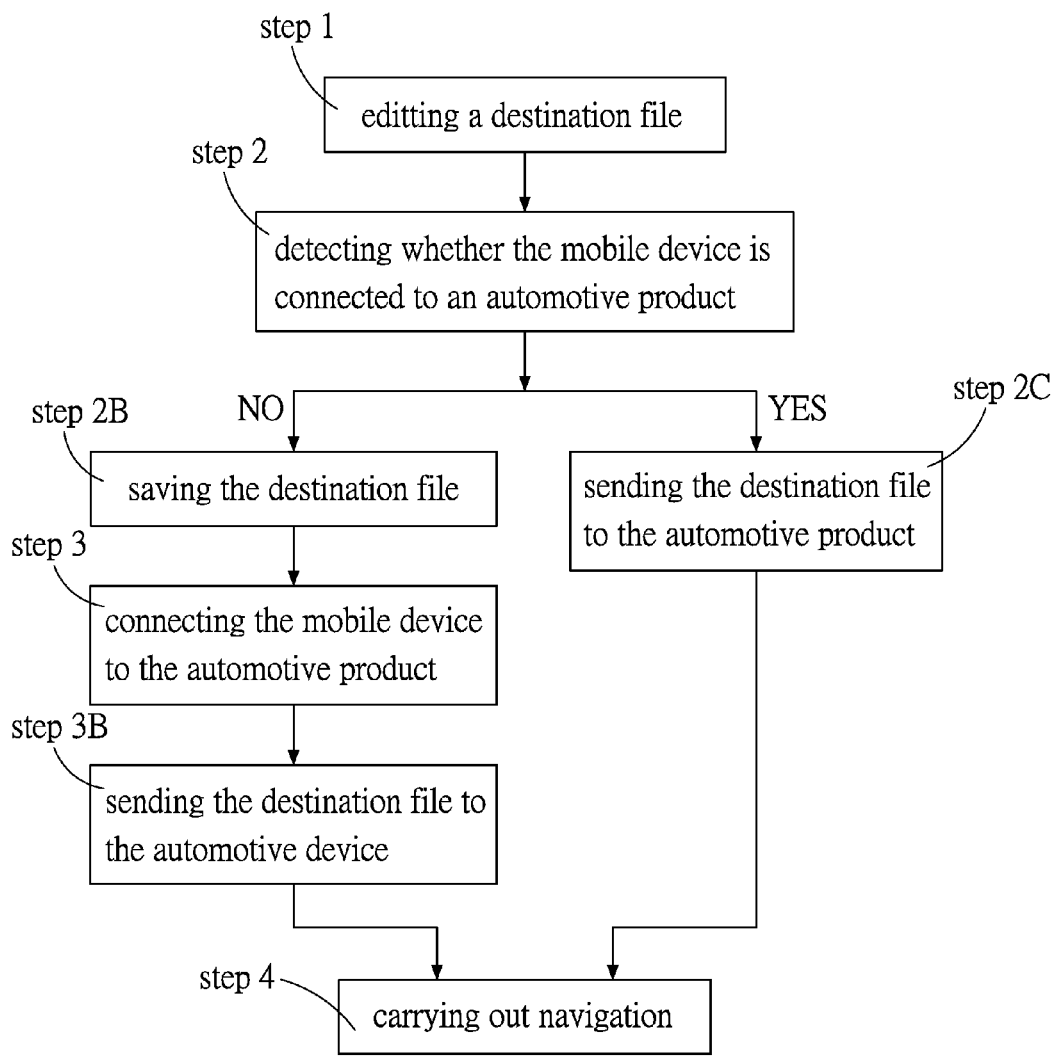
FIG. 1 is a flow chart showing a trip planning method by using an automotive product in accordance with a preferred embodiment of the present invention.
Figure 2:
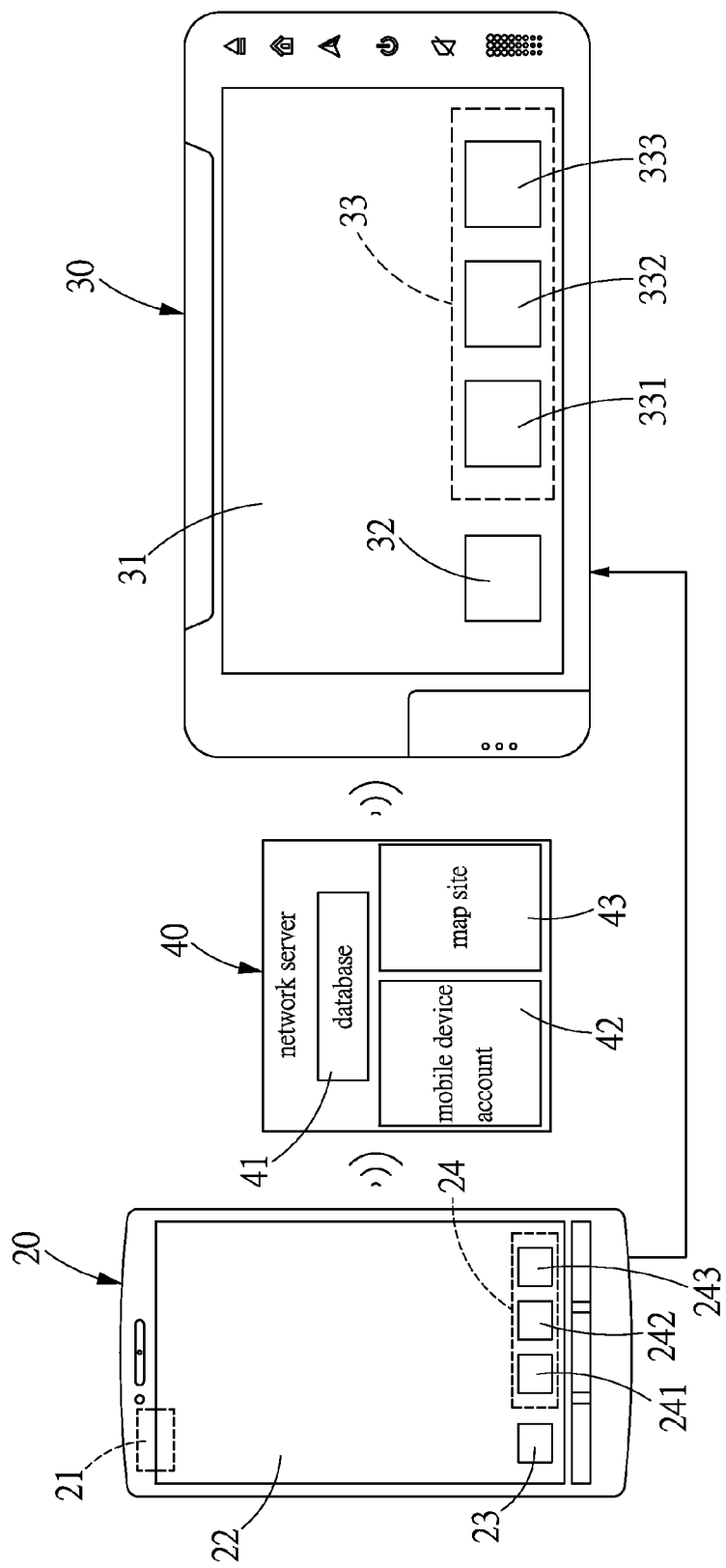
FIG. 2 is an illustrative view showing the trip planning method by using an automotive product in accordance with the present invention.

Referring to FIGS. 1 and 2, a trip planning method by using an automotive product in accordance with a preferred embodiment of the present invention comprises the following steps:

The mobile device 20 in this embodiment is a smart phone or tablet computer. The basic data 21 of the mobile device 20 can be MAC (media access control address) address or UUID (universally unique identifier). The mobile device 20 is connected to the network server 40 via 3G, 4G, 5G, Wi-Fi or Internet in a wireless manner to perform data transmission.

The step 2 of detecting whether the mobile device is connected to an automotive product: the application program detects whether the mobile device 20 is connected to an automotive product 30 or not, when the mobile device 20 is connected to the automotive product 30, skip to a step 2C. If the application program detects that the mobile device 20 is disconnected from the automotive product 30, skip to a step 2B.

The step 2B of saving the destination file 24: the application program sends the destination file 24 to the network server 40 and save the destination file 24 in the mobile device account 42, then skip to a step 3.

The step 2C of sending the destination file to the automotive product: the mobile device 20 uses the application program to send the destination file 24 to the automotive product 30, then skip to a step 4.

In this embodiment, the automotive product 30 is a vehicle mount computer, car audio, head-up display device, or satellite navigation device. The automotive product 30 is connected to the mobile device via Wi-Fi or Bluetooth to perform data transmission.

The step 3 of connecting the mobile device to the automotive product: the user connects the mobile device to the automotive product 30, and more specifically, the user takes the mobile device 20 to a car, so that the automotive product 30 acquires the basic data 21 of the mobile device 20 (the basic data 21 of the mobile device 20 in this embodiment can be MAC address or QUID), the automotive product 30 is connected to the network server 40 to send out the basic data 21 of the mobile device 20, the network server 40 detects whether the basic data 21 of the mobile device 20 is saved in the mobile device account 42 or not, if yes, skip to a step 3B.

The step 3B of sending the destination file 24 to the automotive device 30: the network server 40 sends the destination file 24 which is saved in the mobile device account 42 to the automotive product 30, then skip to the step 4.

The step 4 of carrying out navigation: the automotive product 30 displays the destination file 33 on an automotive-product display area 31, if the destination file 33 does not contain GPS coordinates, after receiving the address, the automotive product 30 will analyze the GPS coordinates of the destination and locate the destination by comparing with the database, then carry out navigation based on the destination file 33.

What mentioned above is the trip planning method by using an automotive product in accordance with a preferred embodiment of the present invention. Please then refer to FIG. 2, which shows the connection between the mobile device 20 and the automotive product 30, wherein the mobile device 20 is a smart phone or a tablet computer, and contains the basic data 21 of the mobile device 20, and the basic data 21 of the mobile device 20 is MAC address or UUID. The mobile device 20 is provided on an outer surface thereof with a mobile-device display area 22 and the mobile-device transfer key 23. In this embodiment, the mobile-device transfer key 23 is a virtual key and disposed in the mobile-device display area 22. The mobile-device display area 22 also displays the destination file 24 which includes the name of a destination 241, location of a tourist spot 242 or contact details of a tourist spot 243, map of a destination, explanatory notes, and etc. The location of a tourist spot 242 can be a GPS coordinate or address. The contact details of a tourist spot 243 can be a telephone number or an email address. The user can edit the destination file 24 on the mobile device 20.

The mobile device 20 is connected to the network server 40 via 3G, 4G, 5G, Wi-Fi or Internet in a wireless manner to perform data transmission. The mobile device 20 is connected to the automotive product 30 to perform data transmission via Wi-Fi or Bluetooth.

The network server 40 includes the database 41 which includes at least one mobile device account 42 and the map site 43. The least one mobile device account 42 at least includes the basic data of the mobile device. The map site 43 contains the map data of some regions or the world.

The automotive product 30 is a vehicle mount computer, car audio, head-up display device, or satellite navigation device. The automotive product 30 is provided on the outer surface thereof with a display area 31 and a transfer key 32. In this embodiment, the automotive-product transfer key 32 is a virtual key disposed in the automotive-product display area 31. The automotive-product display area 31 further displays the destination file 33 which includes the name of a destination 331, location of a tourist spot 332 or contact details of a tourist spot 333, map of a destination, explanatory notes, and etc. The location of a tourist spot 332 can be a GPS coordinate or address. The contact details of a tourist spot 333 can be a telephone number or an email address. The user can edit the destination file on the automotive product 30.

The map data of the map site 43 can be displayed both in the mobile-device display area 22 of the mobile device 20 and the automotive-product display area 31 of the automotive product 30.

Figure 3:
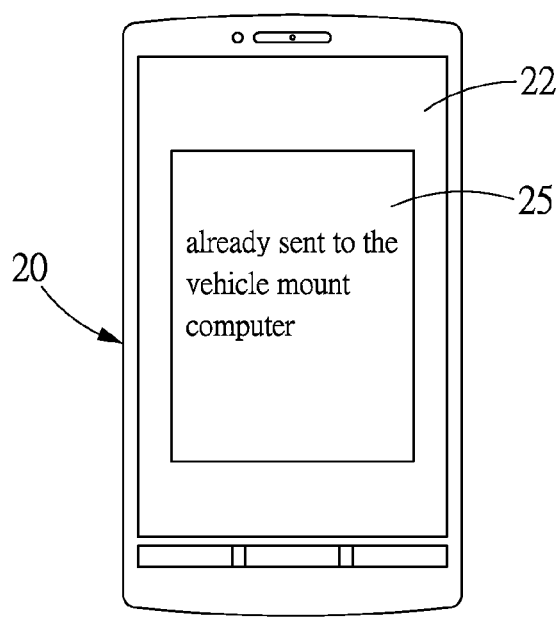
FIG. 3 is an illustrative view showing that a sent sign is displayed on the mobile-device display area of the mobile device associated with the trip planning method by using an automotive product in accordance with the present invention.

Referring then to FIG. 3, after the application program sends the destination file 24 from the mobile device 20 to the automotive product 30, the mobile-device display area 22 of the mobile device 20 will display a "sent sign" 25 which can be a text message that reads "already sent to the vehicle mount computer".

Figure 4:
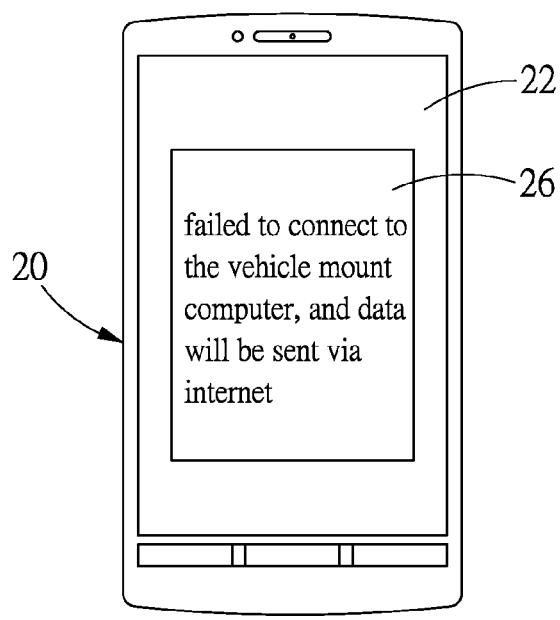
FIG. 4 is an illustrative view showing that a disconnected sign is displayed on the mobile-device display area of the mobile device associated with the trip planning method by using an automotive product in accordance with the present invention.

Referring then to FIG. 4, if the application program detects that the mobile device 20 is disconnected from the automotive product 30, the mobile-device display area 22 will display a "disconnected sign" 26 which can be a text message that reads "failed to connect to the vehicle mount computer, and data will be sent via internet".

While we have shown and described various embodiments in accordance with the present invention, it is clear to those skilled in the art that further embodiments may be made without departing from the scope of the present invention.

What is claimed is:

1. A trip planning method by using an automotive product comprising the following steps:
    a step 1 of forming a database on a network server, the database having at least one mobile device account and a map site, the least one mobile device account at least including a basic data of a mobile device connected to the network server via an application program; editing, by a user, a destination file on the mobile device, going to a step 2 after sending out a transfer instruction by the user;
    the step 2 of detecting, by the application program, whether the mobile device is connected to an automotive product; sending, by the application program, the destination file which includes GPS coordinates or an address of a destination to the automotive product, and skipping to a step 4, if the mobile device is found to be connected to the automotive product; sending the destination file, by the application program, to the network server and saving the destination file in the mobile device account, then going to a step 3, if the mobile device is found to be disconnected from the automotive product;
    the step 3 of connecting the mobile device, by the user, to the automotive product; acquiring, by the automotive product, the basic data of the mobile device; connecting the automotive product to the network server for data transmission, and sending out the basic data of the mobile device; detecting, by the network server, whether the basic data of the mobile device is saved in the mobile device account or not, if yes, sending, by the network server, the destination file saved in the mobile device account to the automotive product, and going to the step 4; and
    the step 4 of carrying out navigation by the automotive product based on the destination file.

2. The trip planning method as claimed in claim 1, wherein in the step 2, the mobile-device display area of the mobile device displays a sent sign after the destination file is sent from the mobile device to the automotive product by the application program.

3. The trip planning method as claimed in claim 1, wherein in the step 2, the mobile-device display area displays a disconnected sign, if the application program detects that the mobile device is disconnected from the automotive product.

4. The trip planning method as claimed in claim 1, wherein the basic data of the mobile device is a media access control address or a universally unique identifier.

5. The trip planning method as claimed in claim 1, wherein the mobile device is a smart phone or a tablet computer.

6. The trip planning method as claimed in claim 1, wherein the mobile device is connected to the network server in a wireless manner to perform data transmission.

7. The trip planning method as claimed in claim 1, wherein the automotive product is connected to the mobile device to perform data transmission.

8. The trip planning method as claimed in claim 1, wherein the automotive product is a vehicle mount computer, car audio, head-up display device, or satellite navigation device.

9. The trip planning method as claimed in claim 1, wherein the destination file further includes the name, map, explanatory notes of the destination.

10. The trip planning method as claimed in claim 1, wherein the destination file includes name and address of a destination but does not contain GPS coordinates, after receiving the address, the automotive product will analyze the GPS coordinates of the destination and locate the destination by comparing with the database.

\* \* \* \* \*